United States Patent
Dupont et al.

(10) Patent No.: US 7,928,387 B2
(45) Date of Patent: Apr. 19, 2011

(54) DEVICE FOR DETECTING INFRARED RADIATION WITH BOLOMETRIC DETECTORS

(75) Inventors: Benoît Dupont, Grenoble (FR); Olivier Legras, Voiron (FR)

(73) Assignee: Ulis, Veurey Voroize (FR)

(*) Notice: Subject to any disclaimer, the term of this patent is extended or adjusted under 35 U.S.C. 154(b) by 0 days.

(21) Appl. No.: 12/127,976

(22) Filed: May 28, 2008

(65) Prior Publication Data
US 2009/0008555 A1 Jan. 8, 2009

(30) Foreign Application Priority Data
Jul. 2, 2007 (FR) .................................. 07 56214

(51) Int. Cl.
*G01J 5/00* (2006.01)
(52) U.S. Cl. .............. 250/338.1; 250/332; 250/208.1; 250/339.02; 250/339.04; 250/336.1
(58) Field of Classification Search ............. 250/338.1, 250/332, 208.1, 339.02, 339.04, 336.1
See application file for complete search history.

(56) References Cited

U.S. PATENT DOCUMENTS

| | | | | |
|---|---|---|---|---|
| 5,572,015 A * | 11/1996 | Bird et al. | ............ | 250/208.1 |
| 5,952,659 A * | 9/1999 | Yoneyama et al. | ......... | 250/332 |
| 6,141,048 A * | 10/2000 | Meyers | ............ | 348/294 |
| 6,518,962 B2 * | 2/2003 | Kimura et al. | ............ | 345/211 |
| 6,583,416 B1 * | 6/2003 | Villani | ............ | 250/332 |
| 6,704,050 B1 * | 3/2004 | Washkurak et al. | ......... | 348/294 |
| 7,616,231 B2 * | 11/2009 | Farrier | ......... | 348/208.99 |
| 2003/0057372 A1 * | 3/2003 | Iida et al. | ............ | 250/338.4 |
| 2005/0029454 A1 * | 2/2005 | Iida et al. | ............ | 250/332 |
| 2005/0092924 A1 * | 5/2005 | Secundo et al. | ............ | 250/331 |
| 2006/0007249 A1 * | 1/2006 | Reddy et al. | ............ | 345/690 |
| 2006/0226366 A1 * | 10/2006 | Tanaka et al. | ............ | 250/338.1 |
| 2006/0250331 A1 * | 11/2006 | Sempel et al. | ............ | 345/76 |
| 2007/0215805 A1 * | 9/2007 | Boie et al. | ............ | 250/338.1 |
| 2007/0284532 A1 * | 12/2007 | Nakanishi et al. | ....... | 250/339.02 |

(Continued)

FOREIGN PATENT DOCUMENTS
EP 1 117 250 A2 7/2001

OTHER PUBLICATIONS

Trouilleau, C. et al., "*35 μm Pitch at Ulis, a Breakthrough*," Proceedings of SPIE, SPIE, Bellingham, WA, US, vol. 5873, No. pt II, 2005, pp. 578-585.

(Continued)

*Primary Examiner* — David P Porta
*Assistant Examiner* — Djura Malevic
(74) *Attorney, Agent, or Firm* — Burr & Brown

(57) ABSTRACT

A device for detecting infrared radiation comprising an array of bolometric detectors which are sensitive to incident radiation and are referred to as "active" and a bolometer which is insensitive to said radiation and is referred to as "blind" formed on a substrate in which a read circuit is produced for sequentially addressing each of the rows of detectors of the array, each of the active bolometers in a single row being biased simultaneously. The read circuit also comprises means of producing a reference current ($I_{ref}$) based on the blind bolometer; means of simultaneously copying the reference current ($I_{ref}$) for each column of the array; and a plurality of current integrators, each associated with one column of the array and each designed to integrate the difference between the current flowing through the active bolometer of the row which is currently being read and said thus copied reference current.

6 Claims, 2 Drawing Sheets

U.S. PATENT DOCUMENTS

2008/0042048 A1* 2/2008 Asayama et al. .......... 250/208.1

OTHER PUBLICATIONS

Mottin, E. et al., "*Uncooled Amorphous Silicon Technology Enhancement for 25 μm Pixel Pitch Achievement*," Proceedings of SPIE, vol. 4820, SPIE, 2003, pp. 200-207.

Fieque, Bruno et al., "*320 × 240 Uncooled Microbolometer 2D array for Radiometric and Process Control Applications*," SPIE, Optical Systems Design Conference, Saint-Etienne, France, Sep. 29-Oct. 3, 2003, SPIE 5251 (7 pages).

Trouilleau, C. et al., "*Low Cost Amorphous Silicon Based 160 × 120 Uncooled Microbolometer 2D Array for High Volume Applications*," Proceedings of SPIE, SPIE, Bellingham, WA, US, vol. 5251, 2004, pp. 129-135.

* cited by examiner

DEVICE FOR DETECTING INFRARED RADIATION WITH BOLOMETRIC DETECTORS

FIELD OF THE INVENTION

The present invention relates to a device for detecting infrared radiation which uses bolometric detectors. The application area of the invention is infrared imaging in particular.

BACKGROUND OF THE INVENTION

In the field of infrared detectors, the use of devices designed in the form of an array which are capable of operating at ambient temperature, i.e. which do not require cooling down to very low temperatures, is known—these are contrasted with detection devices referred to as "quantum infrared detectors" which can only operate at very low temperature, typically at the temperature of liquid nitrogen.

These uncooled detectors traditionally use the variation in a physical unit of an appropriate material as a function of temperature at around 300 K. In the case of bolometric detectors, this physical unit is electrical resistivity.

Such an uncooled detector is generally associated with:
means of absorbing the infrared radiation and converting it into heat;
means of thermally insulating the detector so that its temperature can rise due to the effect of the infrared radiation to be detected;
thermometric means which, in the context of a bolometric detector, use a resistance element;
and means of reading electrical signals provided by the thermometric means.

Detectors intended for infrared imaging are conventionally produced as a one- or two-dimensional array of elementary detectors, said array being "monolithically" formed or mounted on a substrate generally made of silicon which incorporates means of sequentially addressing the elementary detectors and means of electrically exciting (stimulating) and of pre-processing the electrical signals generated by these elementary detectors. These means of sequential addressing, electrical excitation and pre-processing are formed on the substrate and constitute a read circuit.

In order to obtain a scene using this detector, the scene is projected through suitable optics onto the array of elementary detectors, each of them constituting an image dot or pixel, and clocked electrical stimuli are applied via the read circuit to each of the elementary detectors or to each row of such detectors in order to obtain an electrical signal which is an image of the temperature reached by each of said elementary detectors. This signal is then processed to a greater or lesser extent by the read circuit and then, if applicable, by an electronic device outside the package in order to generate a thermal image of the observed scene.

The essential difficulty encountered when using bolometric detectors is the extremely small relative variation in their electrical resistance which is representative of the local temperature variations in an observed scene relative to the average value of these resistances.

The constructionally dictated presence of a finite thermal resistance between the bolometer and the substrate means that the temperature of the bolometer is influenced by the temperature of the substrate much more sensitively than temperature variations due to the incident flux which are the only variations to be taken into account from the point of view of the signal to be detected. Residual fluctuations in the temperature of the substrate under normal thermal stabilization conditions, all the more so if the detector does not have such a thermal stabilization system as is increasingly the case with this type of detector in order to reduce its cost, consequently produce an unwanted component in the signal obtained from the bolometer which adversely affects the quality of the signal. Conventionally, the substrate is thermally controlled in order to prevent or at least limit this effect.

In addition, "compensation" structures are used in order to minimize the effects of the temperature of the focal plane on the detector's response. These structures, which are usually bolometers referred to as "blind bolometers", i.e. bolometers which are not sensitive to the incident optical flux but which are sensitive to the temperature of the substrate, are used in order to generate a so-called compensation current which is subtracted from the current obtained from the imaging bolometers, i.e. the detection bolometers, due to the way in which the electronic circuit is configured.

These compensation structures are typically built so that they have a very low thermal resistance relative to the substrate, unlike the imaging bolometers.

This way, most of the current referred to as "common-mode current", i.e. current which is not representative of information originating from the scene to be detected, is eliminated.

Also and advantageously, because the compensation structures are substantially at the same temperature as the read circuit and therefore the focal plane, this actually allows significant rejection of any fluctuations in the temperature of the focal plane. Arranging these compensation structures "identically" and repetitively in each column of the array so as to reduce the complexity and overall dimensions of the circuit is a known tactic.

Every bolometer column is sequentially compensated by the same compensation structure when the image is electronically scanned one row at a time. However, compensation structures naturally exhibit spatial variations in resistance because of the technology processes used in their fabrication (which normally originate from the semiconductor industry).

In addition, blind bolometers, like imaging bolometers, as well as certain functions of the read circuit, are affected by noise phenomena in general and so-called "1/f" noise in particular. 1/f noise typically produces low-frequency drift, especially very low frequency drift, of the output level of the sensors which adversely affects the quality of the imager. The columnar arrangement of the compensation structures has a negative impact on the quality of the image because of low-frequency variations in the compensated signal which are asynchronous from one column to the next. Besides any special design and implementation measures taken in order to reduce this variability, compensation algorithms must, generally speaking, be developed and applied at the output of the imager in order to improve image quality.

Read circuits for resistive bolometric detectors which use blind bolometers are described, for instance, in the following applications:

"*Uncooled amorphous silicon technology enhancement for* 25 µm *pixel pitch achievement*>>, E. MOTTIN et al; Infrared Technology and Applications XXVIII, SPIE Vol. 4820;

"320×240 *uncooled microbolometer 2D array for radiometric and process control applications*" B. FIEQUE et al; Optical Systems Design Conference, SPIE 5251, September 29;

"*Low cost amorphous silicon based* 160×120 *uncooled microbolometer 2D array for high volume applications*" C. TROUILLEAU et al; Optical Systems Design Conference SPIE 5251-16.

The principle of reading an active array of bolometers is shown schematically in relation to FIG. 1.

Pixel 1 (the term "pixel" is construed here, by extension, as denoting all the structures located so that they are under the influence of one elementary detection point) comprises an active bolometer 2, an NMOS charge injection transistor 3 and a switch 4 which connects pixel 1 to read column 5 and is represented here by a dashed line. Compensation structure 6, which is also referred to as a base clipper in the terminology used in the technical field in question, comprises a blind bolometer 7 connected to power supply VSK and PMOS charge injection transistor 8. During normal operation, the PMOS transistor is in saturation mode. Its current $I_{comp}$ which flows in the compensation arm is defined by the expression:

$$Icomp = \frac{Vcomp}{Rcomp}$$

where:
Vcomp denotes the voltage across the terminals of compensation bolometer 7;
Rcomp denotes the resistance of said compensation bolometer.

The current which flows through the active arm which comprises NMOS charge injection transistor 3 is expressed by the relation.

$$Iac = \frac{Vac}{Rac}$$

where:
Iac denotes the current of the active arm;
Vac denotes the voltage across the terminals of active bolometer 2;
Rac denotes the resistance of said active bolometer.

The bias voltages of the MOS charge injection transistors are chosen so that, in the absence of any incident scene light flux, i.e. for example when the system is optically shuttered, the difference in current $dI = I_{comp} - I_{ac}$ between the active arm and the blind compensation arm is substantially zero.

Reading an active bolometer is a two-phase operation. The first phase involves actuating "reset" switch 9 which short-circuits integration capacitance 10 of operational amplifier 11. This gives:

$$V_{out} = V_{BUS}$$

Read column 5 shown by dashed line 5 is therefore brought to the potential $V_{BUS}$. "Reset" switch 9 is then opened and "select" switch 4 is closed to connect pixel 1 to read column 5. Current difference dI is integrated by capacitance Cint 10 over finite integration time $T_{int}$. Integration produces an output voltage level referred to as "continuous level" or NC in the reference case where a uniform temperature scene is observed, this typically reveals the variability of the imaging array. This is the standard method for characterizing the reading of active bolometers.

$$NC = VBus - \frac{T\,int}{C\,int}dI$$

Bolometers are biased so as to ensure both a dynamic output signal response and efficient compensation.

A more rigorous expression would be obtained by considering, for the last term, the integral of the function dI(t) over Tint because currents $I_{ac}$ and $I_{comp}$ are not constant. However, for the sake of clarity, the above expression is sufficient to explain the parameters which are to be taken into consideration.

This read system has certain limitations associated with the way in which the columnar compensation pattern is reproduced on the read circuit. In fact, each column has a compensation bolometer and a PMOS charge injection transistor. Imperfect reproduction of these various elements from one column to the next which is inherent in the intrinsic spatial variability of the fabrication technologies used results in non-uniform compensation efficiency. This statistical variability results in a compensation current which is not uniform from one column to the next and causes the appearance of visible columnar contrasts which thus affect the available signal.

Variation $\Delta R_{comp}$ on resistance $R_{comp}$ results in a current variation of the following form:

$$\frac{\partial Icomp}{\partial Rcomp} = \frac{Vcomp}{Rcomp^2} \Rightarrow \Delta Ibolo = -\frac{Vcomp}{Rcomp^2} \cdot \Delta Rcomp$$

The compensation current can also be expressed as a function of the equation for the current in the MOSFET charge injection transistor in accordance with the following expression:

$$Icomp = \frac{\mu_p C_{ox}}{2} \cdot \frac{W_p}{L_p}(V_{SGP} - V_{thp})^2$$

where:
$\mu_p$ denotes the mobility of the positive carriers;
$C_{ox}$ denotes the gate oxide capacity;
$W_p$ denotes the PMOS channel width;
$L_p$ denotes the PMOS channel length;
$V_{SGP}$ denotes the gate voltage of the PMOS transistor;
$V_{thP}$ denotes the threshold voltage of the PMOS transistor.

Many parameters in this equation may vary, thus producing columnar non-uniformity of the compensation current. Obviously, lithographic parameters $W_p$ and $L_p$ from one column to the next involve current differences. Fluctuation in the length of the channel is also one of the possible causes of this non-uniformity. There are techniques which are familiar to those skilled in the art in order to limit these variations.

In contrast, variation in threshold voltage $V_{thP}$ poses a problem. Assuming the threshold-voltage variation is $\delta Vth$, the columnar current variation can then be expressed as follows:

$$\delta Icomp = \frac{\mu_p C_{ox}}{2} \cdot \frac{W_p}{L_p} \delta V_{thp} \left( 2\sqrt{\frac{Icomp}{\frac{\mu_p C_{ox}}{2} \cdot \frac{W_p}{L_p}}} + \delta V_{thp} \right)$$

Besides this static variation, the circuit shown in FIG. 1 is also sensitive to low-frequency fluctuations associated with 1/f noise. The 1/f noise power developed between two frequencies $f_{min}$ and $f_{max}$ is expressed by integrating the spectral noise density between these two bounds in accordance with the relation:

$$Icomp^2 = \int_{fmin}^{fmax} \frac{4k_B T}{R} \frac{R \cdot Vcomp^2}{R \cdot f} df$$

$$= \frac{4k_B T}{R} \frac{K_F \cdot R \cdot Vcomp^2}{R} \ln\left(\frac{f\max}{f\min}\right)$$

where:
$k_B$ is Boltzmann's constant;
$K_F$ denotes the l/f noise coefficient of the material.

The noise power added by the compensation structure, as expressed by the above relation, increases by a constant increment for each additional frequency decade included between the two integration bounds $f_{min}$ and $f_{max}$. The compensation bolometers are permanently biased and the lower frequency bound $f_{min}$ during integration can therefore be considered to be very low, to the extent that the component remains energized over an extended period once the detector is activated. Columnar interference (expressed by those skilled in the art analytically as the above noise power) manifests itself as an offset which, in the first order, is invariable from one image to the next if one considers frequencies lower than the frame frequency, but is variable over a more extended period of time if the camera in which such a detector is fitted has been operating for several minutes.

Beside this limitation, the market trend towards bolometric sensors with an increased number of pixels means that the compensation bolometers of each column, which are effective in small imagers as an absolute temperature reference, act as "local" temperature references from the point of view of the active bolometers which are the furthest away. Thus, if a thermal source of any origin whatsoever, for example circuitry elements which locally dissipate more or less heat, can influence all or some of the compensation bolometers, the latter will be influenced relatively to their distance from the source of interference, and thus reproduce a compensation current distribution which is inappropriate to the temperature variation of the substrate as seen by the sensitive bolometers which are not concerned or, generally speaking, be influenced differently by said thermal source.

The present invention relates to a detection device which uses a single compensation structure and makes it possible to overcome image quality limitations, especially those associated with differences in columnar contrast.

SUMMARY OF THE INVENTION

This device for detecting infrared radiation comprises an array of bolometric detectors which are sensitive to the incident radiation and are referred to as "active" and a bolometer which is insensitive to said radiation and is referred to as "blind" formed on a substrate in which a read circuit is produced for sequentially addressing each of the rows of detectors of said array, each of the active bolometers in a single row being biased simultaneously.

According to the invention, the read circuit also comprises:
means of producing a reference current based on the blind bolometer;
means of simultaneously copying said reference current for each column of the array;
a plurality of current integrators, each associated with one column of the array and each designed to integrate the difference between the current flowing through the active bolometer of the row which is currently being read and said thus copied reference current.

In other words, the entire array of bolometers is compensated by a single structure which thus makes it possible to prevent the columnar contrast which is observed when using detectors according to the prior art.

According to the invention, the means of producing the reference current comprise:
a power supply line connected to one of the terminals of said blind bolometer;
a charge injection transistor connected to the other terminal of said blind bolometer so as to impose the reference current through a voltage applied to its gate;
a current-to-voltage converter which converts said reference current to a reference voltage.

According to the invention, the blind bolometer may consist of one or more elementary blind bolometers connected together. This blind bolometer or these blind bolometers are produced in similar fashion to the active bolometers but have negligible thermal resistance relative to the substrate.

According to the invention, the means of simultaneously copying said reference current, for each column of the array, consist of current mirrors located in each of said columns, said mirrors each comprising a voltage-to-current converter.

According to one advantageous aspect of the invention, the current mirror used in each of the columns is a differential current mirror.

BRIEF DESCRIPTION OF THE DRAWINGS

The way in which the invention is implemented and its resulting advantages will be made more readily understandable by the following description, given merely by way of example, reference being made to the accompanying drawings.

DETAILED DESCRIPTION OF THE INVENTION

In the rest of this description, the same reference number is used to identify elements which are identical or of the same functional type, when applicable.

Generally speaking and as already stated, the array of bolometric detectors is formed on a silicon substrate in which the read circuit is produced. This substrate is traditionally covered, in the area of its active structures, i.e. vertically below the optically sensitive area, in a reflective metallic layer. This layer is designed, in a known manner, to form a quarter-wave cavity between the substrate and the absorbent parts of the detector.

The optically active areas are formed by "paved" suspended membranes which comprise, above the read circuit, a bolometric material. These membranes are supported by means of structures which are substantially vertical and electrically conductive. These structures, made of a metallic material, are also designed to route the excitation potentials generated by the read circuit towards the conductive parts, also referred to as "electrodes", of the membrane of each elementary bolometric detector via elongated structures which are also electrically conductive but thermally non-conductive.

This thermal resistance which is also referred to as "thermal isolation" is intended to allow the temperature of the bolometer to rise due to the effect of the infrared radiation that is to be detected.

The read circuit sequentially applies an electrical current which flows through the suspended structure. This current flows through a material, the resistivity of which varies with temperature and which is referred to as a "bolometric material". The most widely used materials for this application are vanadium oxide (generic formula $VO_x$) and amorphous silicon (a-Si).

Figure 2:
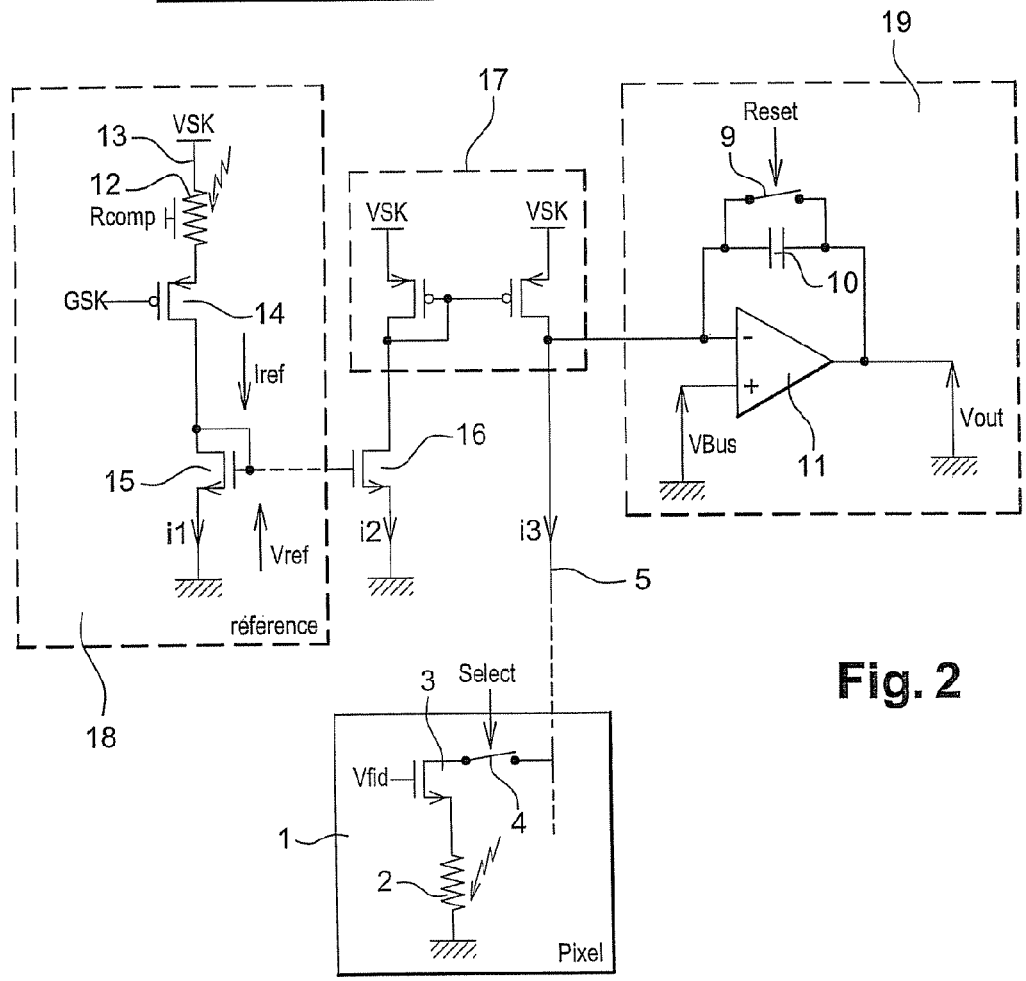
FIG. 2 is a schematic view similar to FIG. 1 but showing the general principle of the invention.

This array is provided with a compensation structure designed to shunt most of the common mode current which flows through each of the bolometric detectors which constitute the array, the principle of which is described in relation to FIG. 2. This compensation structure is unique for the entire array.

According to one aspect of the invention, this single compensation structure 18 comprises a blind compensation bolometer 12, more precisely insensitive to the infrared radiation, with a resistance $R_{comp}$ consisting of one or several elementary bolometers connected together. A power supply line 13 (VSK) is connected to one of the terminals of said resistance $R_{comp}$. The other terminal of said resistance is connected to a charge injection transistor 14 so as to impose a reference current ($I_{ref}$) across resistance $R_{comp}$ of compensation bolometer 12 by means of a gate voltage (GSK) applied to the gate of said transistor. This being so, blind bolometer 12 is constantly biased by means of charge injection transistor 14 which is controlled by the gate voltage (GSK).

A current-to-voltage converter 15 converts the reference current ($I_{ref}$) to a reference voltage ($V_{ref}$)

This reference current ($I_{ref}$) is duplicated for each of the columns by means of current mirror 16 located in said columns 5, each one comprising a voltage ($V_{ref}$) to Current ($I_{ref}$) converter.

Current mirrors are very familiar to those skilled in the art and there is therefore no need to describe them here in more detail. The reader is simply reminded that such a current mirror is a special circuit consisting of transistors which make it possible to reflect (duplicate) reference current $I_{ref}$ as an output current which is ideally equal to but always proportional to the reference current regardless of the load connected to the output current, in this case the integrator 45 described below.

In fact, a current integrator 19, formed by amplifier 11 and capacitance 10, is associated with each of columns 5 of the array. This integrator is designed to integrate the difference between the current flowing through active bolometer 2 of the row which is currently being read and the reference current ($I_{ref}$) from the current mirror.

Reference current ($I_{ref}$) is therefore copied according to current $I_2$ to all the columns of the array with the aid of current mirror 16. Each of said columns has an additional current mirror 17 in order to reverse the direction of current $I_2$ into a compensation current $I_3$ in order to make the reference current ($I_{ref}$) compatible with the integration structure which is classically used.

There are therefore no longer any compensation bolometers in each of the columns, just a single compensation bolometer for the entire array.

It must be emphasized that current mirror 17 is only necessary if active bolometer 2 is referenced to the ground of the detector, this condition not being necessary in order for the detector to function. Thus, it is possible to reference active bolometer 2 to voltage VSK or any other potential greater than $V_{BUS}$ a in order to eliminate current mirror 17 by directly connecting the transistor of current mirror 16 to column 5.

The particular device according to the invention overcomes the variation associated with distributed compensation bolometers. It is apparent that one of the sources of columnar variation is eliminated, this variation being one of the drawbacks of detection arrays according to the prior art.

In addition, eliminating such compensation bolometers which are traditionally associated with every column makes it possible to save considerable space in terns of the surface area of the substrate which is used up. The reader is reminded that these compensation structures must have a low-frequency noise level which is as small as possible in order not to degrade the overall performance of the imager. This objective makes it necessary to use a relatively high volume of sensitive material in order to produce low-noise compensation structures and, consequently, requires a considerable surface area because these structures are traditionally produced using thin layers.

The embodiment of the invention shown in FIG. 2 may have limitations due to the geometrical and technological variability of the multiple MOS structures used. The current mirror used in order to distribute current to each column cannot be paired using close design techniques which are familiar to those skilled in the art because the distance between the two arms of said current mirror can easily be several millimeters in commonly encountered applications. Also, in the context of using a mirror structure to distribute current, it is impossible to use known inverse feedback techniques because the reference arm is common to all the mirrors.

Figure 3:
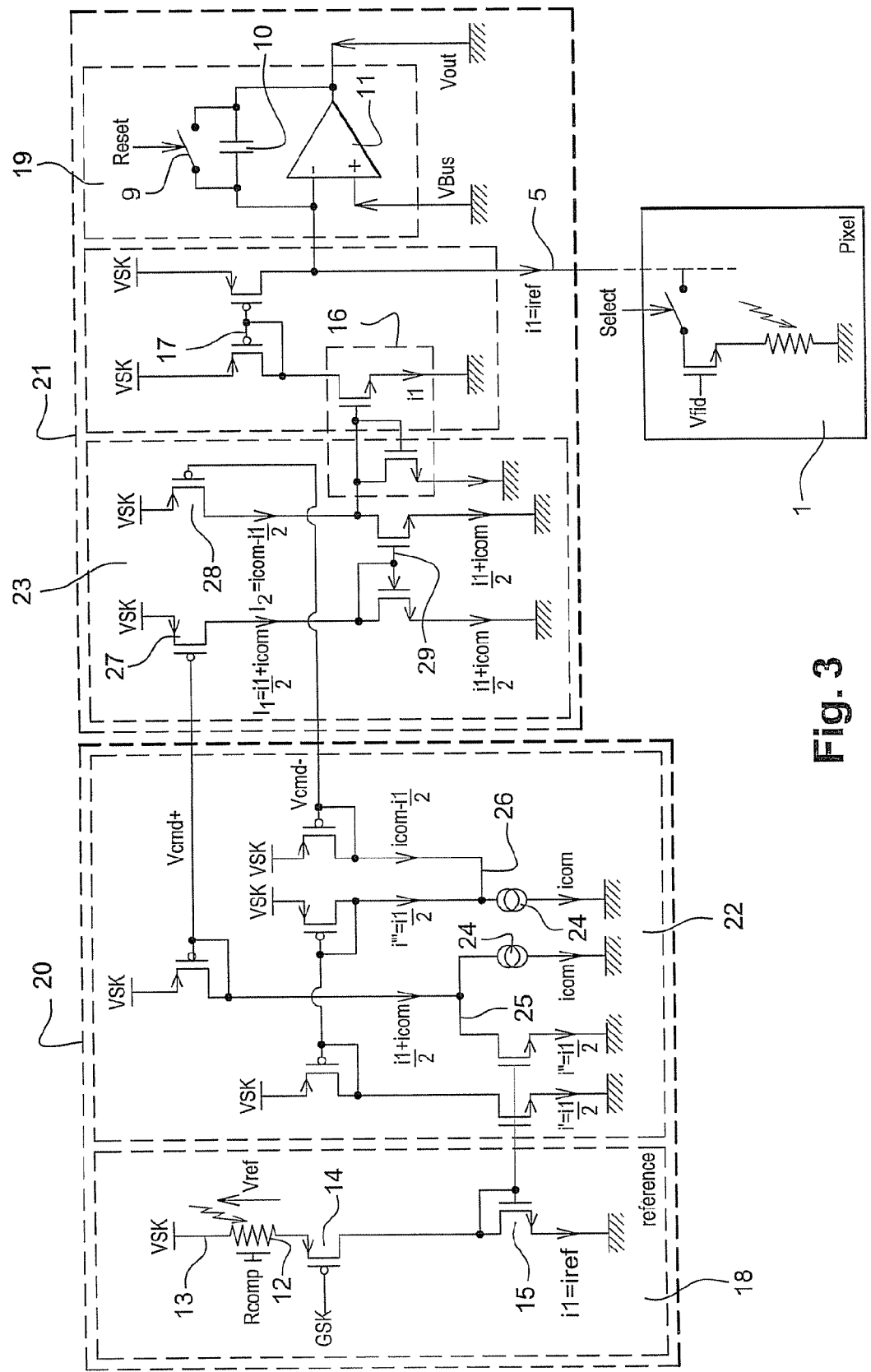
FIG. 3 is a view similar to FIG. 2 of another embodiment of the invention showing the current source and the differential current mirror of the reference structure and the differential mirror of the structure for each column.

In order to overcome these limitations, the invention proposes, in the context of one advantageous embodiment shown in FIG. 3, to use a current mirror with low dispersion and, to achieve this, employs a differential mirror.

In this context, two close transistors can be paired thanks to known design techniques and sizing the transistors carefully.

In this case, reference compensation structure 18 is retained. It constitutes a source of reference current $i_1$=Iref. It is associated with differential current-to-voltage converter 22 which comprises, in a known manner, at least one current mirror and current generators.

More precisely, this converter comprises:
 a source of common mode current Icom 24;
 a current adder 25 which performs the operation Icom+Iref/2;
 a current subtractor 26 which performs the operation Icom−Iref/2.

This converter ensures current-to-voltage conversion so as to define the following respectively:
 a reference voltage $V_{cmd+}$ equivalent to the current Icom+Iref/2;
 a reference voltage $V_{cmd-}$ equivalent to the current Icom−Iref/2;
these two reference voltages being distributed in all the columns of the detector.

It therefore consists of a single structure which is common to the entire detector and identified by reference 20.

Each of the columns comprises a voltage-to-current converter 23, each comprising:
 two voltage-to-current converters 27, 28 which respectively ensure conversion of reference voltage $V_{cmd+}$ to current $I_1$=Icom+Iref/2 and conversion of reference voltage $V_{cmd-}$ to current $I_2$=Icom−Iref/2;
 a current subtractor 29 which performs the operation $I_1-I_2$.

The constructional details and advantages inherent in differential current mirrors are very familiar to those skilled in the art and there is therefore no need to detail them further in the context of the present invention.

The current obtained from this voltage-to-current converter 23 is duplicated for each of the columns by means of current mirror 16 which is also located in each of said columns 5. This being so, reference current ($I_{ref}$) is therefore copied according to current $i_1$ to all the columns of the array with the aid of current mirror 16. Each of said columns has an additional current mirror 17 in order to reverse the direction of current $i_1$ into a compensation current in order to make the reference current ($I_{ref}$) compatible with integration structure 19 described above.

It is apparent that, in the context of this particular embodiment, the transistors which make up single compensation structure 20 are very close to each other and can therefore easily be paired. Similarly, transistors 27 and 28 are located in each column and can therefore also easily be paired. In contrast, the latter cannot be paired with the transistors of structure 20. Working with a dual differential voltage Vcmd+/Vcmd– rather than a single voltage Vref makes it possible to substantially limit the effect of the spatial variation of the elementary electronic structures (MOS) distributed in each column, especially in terms of threshold voltage variation. This being so, greater accuracy is achieved compared with the embodiment in FIG. 2 to the extent that, in the latter, it is not possible to pair transistors 15 and 16, the latter being distributed by column.

Regardless of the embodiment chosen, the compensation bolometer of each column is eliminated. This also eliminates the 1/f noise which it generates in conventional detection structures such as those shown in relation to FIG. 1.

Admittedly, 1/f noise is still present during operation of the single compensation bolometer used in the invention, but this noise can easily be reduced to a negligible quantity by using a sufficiently high volume of bolometric material at the expense of substrate surface area which is very small relative to the total surface area of the imager.

Figure 1:
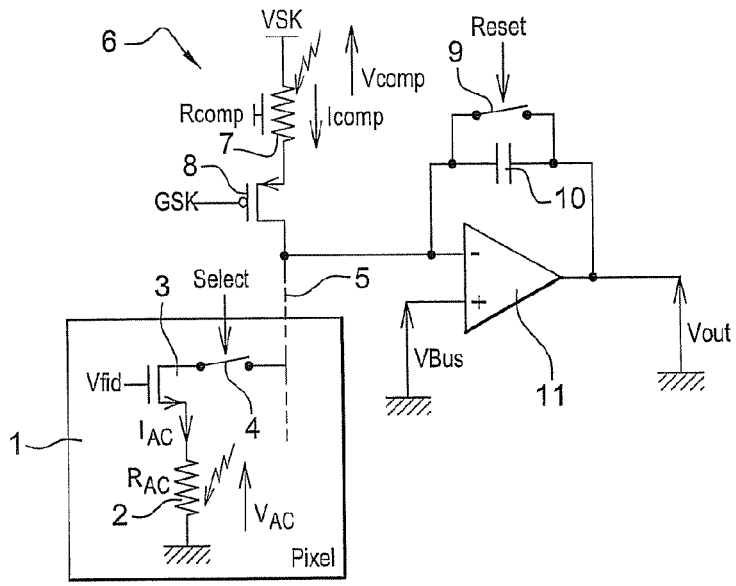
FIG. 1, described above, is a schematic view of the principle used to read an array of active bolometers.

In addition, the surface area which is used up is absolutely negligible compared with the area required to build bolometric compensation structures located in every column in structures according to the prior art as shown in FIG. 1.

Moreover, its effect is applied to all the pixels of the array rather than in an uncorrelated manner from column to column, any residual effect being much less prejudicial.

Finally, the 1/f noise introduced by the current mirrors can be minimized with the aid of techniques which are familiar to those skilled in the art.

The invention has particular applications in the field of image sensors which use bolometric detection, regardless of the optical detection band and the type of bolometric sensor used (especially, but not limitatively, based on amorphous silicon (a-Si), vanadium oxides (Vox) and metals (Ti)).

Besides this, because of its ability to adapt to various operating temperatures, the invention is also applicable to thermally controlled sensors as well as to sensors which operate with a variable focal-plane temperature.

Moreover, its intrinsic good low-frequency noise performance across columns makes it possible to integrate detectors produced in accordance with the invention in cameras which have no shutter.

Obviously, the invention is also perfectly compatible with traditional cameras which do have such a shutter. This achieves a substantial reduction in the manufacturing costs of such cameras and also simplifies their use by the user.

The invention claimed is:

1. A device for detecting infrared radiation comprising an array of bolometric detectors which are sensitive to the incident radiation and are referred to as "active", and a single bolometer which is insensitive to said radiation and is referred to as "blind", formed on a substrate in which a read circuit is produced for sequentially addressing each of the rows of detectors of said array, each of the active bolometers in a single row being biased simultaneously, wherein said read circuit also comprises:
   means of producing a reference current ($I_{ref}$) based on said single blind bolometer;
   means of simultaneously copying and applying said reference current ($I_{ref}$) to a plurality of current integrators; and
   wherein said means of simultaneously copying and applying said reference current and one column of the array are directly connected to a common input of one of said plurality of current integrators;
   said plurality of current integrators, each designed to integrate the difference between the current flowing through the simultaneously biased active bolometer of the row which is currently being read and said thus copied and applied reference current; and
   wherein said plurality of current integrators integrate said current difference all at the same time.

2. A device for detecting infrared radiation as claimed in claim 1, wherein the means of producing said reference current ($I_{ref}$) comprise:
   a power supply line connected to one of the terminals of said blind bolometer;
   a charge injection transistor connected to the other terminal of said blind bolometer so as to impose said reference current ($I_{ref}$) through a voltage applied to its gate;
   a current-to-voltage converter which converts said reference current ($I_{ref}$) to a reference voltage.

3. A device for detecting electromagnetic radiation as claimed in claim 1, wherein said blind bolometer consists of one or more elementary blind bolometers connected to each other.

4. A device for detecting infrared radiation as claimed in claim 1, wherein the means of simultaneously copying said reference current ($I_{ref}$), for each column of the array, consist of current mirrors located in each of said columns, said mirrors each comprising a voltage-to-current converter.

5. A device for detecting infrared radiation as claimed in claim 4, wherein the current mirror used in each of the columns is a differential current mirror.

6. A device for detecting infrared radiation as claimed in claim 1, wherein said reference current consists of a single reference current based on said blind bolometer and the means of simultaneously copying copies said single reference current for each column of the array.

* * * * *